United States Patent [19]

Pavelka et al.

[11] Patent Number: 4,540,304

[45] Date of Patent: Sep. 10, 1985

[54] METAL-TO-CERAMIC ATTACHMENT DEVICE

[75] Inventors: Edwin A. Pavelka; Quirinus G. Grindstaff; Stuart E. Scheppele, all of Bartlesville, Okla.

[73] Assignee: The United States of America as represented by the United States Department of Energy, Washington, D.C.

[21] Appl. No.: 473,821

[22] Filed: Mar. 8, 1983

[51] Int. Cl.³ .............................................. F16B 43/00
[52] U.S. Cl. ...................................... 403/12; 403/17; 403/19; 403/404; 403/28
[58] Field of Search ..................... 403/28, 30, 29, 404, 403/407, 21, 12, 17, 19; 411/10, 11, 546

[56] References Cited

U.S. PATENT DOCUMENTS

| | | | |
|---|---|---|---|
| 2,888,292 | 5/1959 | Schoessow | 403/28 X |
| 3,055,465 | 9/1962 | Pulfrich | 403/30 |
| 4,116,573 | 9/1978 | Fuchs | 403/407 X |
| 4,167,351 | 9/1979 | Bindin | 403/404 X |
| 4,270,871 | 6/1981 | Grise | 403/29 |
| 4,281,941 | 8/1981 | Rottenkolber | 403/29 |

*Primary Examiner*—Andrew V. Kundrat
*Attorney, Agent, or Firm*—L. E. Carnahan; Roger S. Gaither; Judson R. Hightower

[57] ABSTRACT

A metal-to-ceramic fastening device is disclosed for securing a metal member to a ceramic member with respective confronting surfaces thereon clamped together, comprising a threaded bolt adapted to extend through a bolt hole in the metal member and into an aligned opening in the ceramic member, a rod nut threadedly receiving the bolt and adapted to span the opening in the ceramic member, and a pressure limiting member received on the bolt between the nut and the confronting surface of the metal member for limiting the movement of the nut toward the metal member when the bolt is tightened, so as to limit the pressure applied by the nut to the ceramic member to avoid damage thereto. The fastening device also prevents damage to the ceramic member due to thermal stresses. The pressure limiting member may have a shallow dish-shaped depression facing the rod nut to assist in accommodating thermal stresses.

20 Claims, 2 Drawing Figures

METAL-TO-CERAMIC ATTACHMENT DEVICE

The United States Government has rights in this invention by virtue of the fact that this invention was made in the ordinary course of the employment of the inventors by the United States Department of Energy.

FIELD OF THE INVENTION

This invention relates generally to joining a nonmetallic material, such as a ceramic material, to a metal material. More specifically, the invention relates to a fastening device for securing or clamping a metal member and a ceramic member together, while protecting the ceramic member from damaging physical and thermal stresses.

BACKGROUND OF THE INVENTION

One standard procedure for fastening or clamping a metal member to a ceramic member is to drill and tap the ceramic member and to attach the metal member to the ceramic member with screws or bolts. However, difficulty frequently arises from the use of this procedure, because ceramic members break very easily when subjected to unlimited forces by the use of screws, and because ceramic members do not hold threads very well. These problems are compounded when the assembly of the metal and ceramic members must be heated to elevated temperatures, thereby causing the metal and ceramic members to expand at different rates. The thermal stresses thus created in the ceramic member frequently cause it to break. One particular application in which these problems have occurred is in a field-ionization source for a spectrometer which includes a ceramic member held between a base plate and a field plate made of metal. For certain applications, such a spectrometer must be able to withstand temperatures up to 400° C.

OBJECTS OF THE INVENTION

One object of the present invention is to provide means for attaching a metal member to a ceramic member while protecting the ceramic member from failure due to mechanical or thermal stresses.

A further object of the present invention is to provide a fastening device for securing a metal plate or other member to a ceramic member without physically damaging the ceramic member, and while preventing damage to the ceramic member due to differential thermal expansion and contraction.

Another object of the present invention is to provide a ceramic-to-metal fastening device which is suitable for applications in which temperature changes range up to 400° C.

SUMMARY OF THE INVENTION

To achieve these and other objects, the present invention preferably provides a fastening device for securing metal and ceramic elements together, comprising a metal member and a ceramic member having respective confronting surfaces adapted to be clamped together, such metal member having a bolt hole therein, such ceramic member having an opening therein aligned with such bolt hole, a threaded bolt extending through the bolt hole and into such opening, a nut spanning the opening, the ceramic member having a formation receiving such nut and holding the nut at a predetermined distance from the confronting surfaces, such bolt being threadedly received in the nut, and a pressure limiting member received in the opening along the bolt and between the nut and the confronting surface on the metal member, such pressure limiting member having a limiting dimension limiting the movement of the metal member toward the nut and thereby limiting the pressure applied by the nut to the ceramic member to avoid damage to the ceramic member.

The pressure limiting member preferably takes the form of a washer received around the bolt between the nut and the confronting surface on the metal member. The washer has a thickness corresponding to the limiting dimension.

Preferably, the limiting dimension is only slightly less than the predetermined distance. For example, the limiting dimension may be on the order of 0.001 of an inch less than the predetermined distance.

The nut is preferably a rod nut in the form of a rod having a transverse threaded aperture therein for threadedly receiving the bolt. The formation in the ceramic member is preferably in the form of a laterally extending aperture in the ceramic member for lateral insertion of the rod nut. The laterally extending aperture is preferably slightly larger in diameter than the rod nut to provide for thermal expansion of the rod nut. For example, the laterally extending aperture may be larger in diameter than the rod nut by an amount on the order of 0.003 of an inch.

The pressure limiting washer is preferably formed with a shallow dish-shaped depression facing the nut and allowing for slight resilient flexing of the nut to relieve stresses due to temperature changes. The depth of the depression may be on the order of 0.003 of an inch.

In another aspect, the invention preferably provides a fastening device comprising a threaded bolt adapted to extend through a bolt hole in a metal member and into an aligned opening in a ceramic member, a rod nut adapted to span the opening in the ceramic member, such rod nut being in the form of a rod having a threaded aperture for threadedly receiving the bolt, and a pressure limiting washer received around the bolt and engaging the nut for limiting the movement of the rod nut toward the metal member and thereby limiting the pressure applied by the rod nut to the ceramic member to avoid damage to the ceramic member.

The pressure limiting washer is preferably formed with a shallow dish-shaped depression facing toward the rod nut to provide for slight resilient flexing of the rod nut to reduce stresses due to temperature changes.

BRIEF DESCRIPTION OF THE DRAWINGS

Further objects, advantages and features of the present invention will appear from the following description, taken with the accompanying drawings, in which.

DETAILED DESCRIPTION OF AN ILLUSTRATIVE EMBODIMENT

Figure 1:
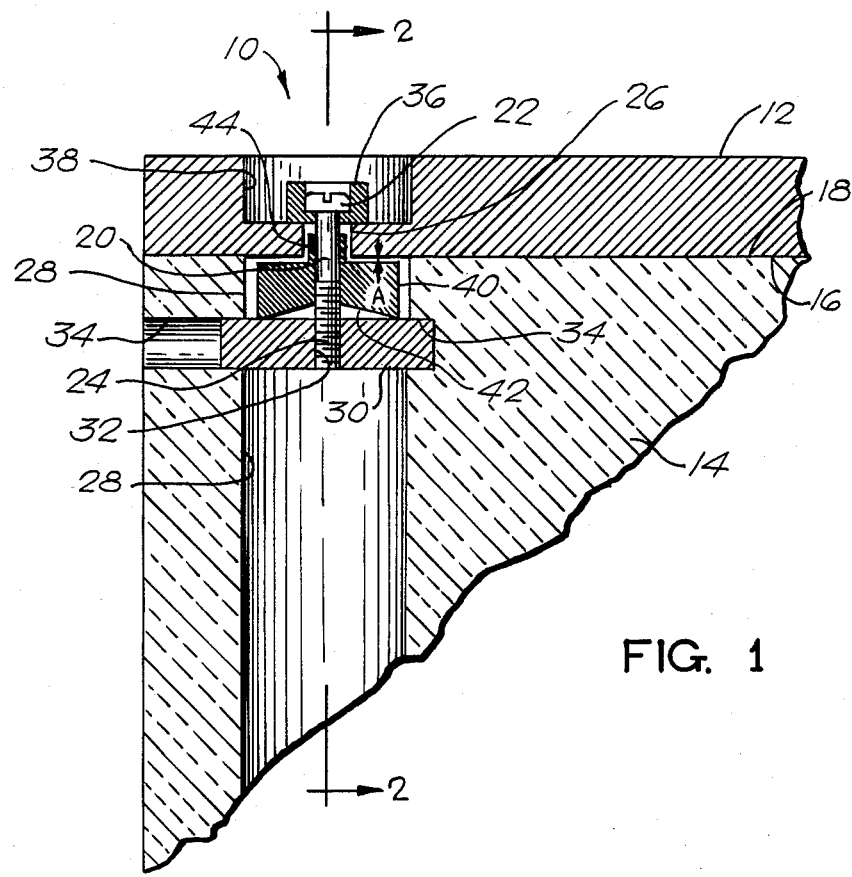
FIG. 1 is a fragmentary diagrammatic elevational section showing a metal-to-ceramic attachment device to be described as an illustrative embodiment of the present invention.

The drawings illustrate a fastening device 10 for attaching or clamping a metal member 12 and a ceramic member 14 together. The metal member 12 is shown in the form of a plate, while the ceramic member 14 may serve as an insulator. The members 12 and 14 have respective confronting surfaces 16 and 18 which are clamped securely together.

The fastening device 10 comprises a bolt or screw 20 having a head 22 and a threaded shank 24. The bolt 20 extends through a bolt hole 26 in the metal member 12 and into an aligned opening 28 in the ceramic member 14. As shown, the opening 28 is larger than the bolt hole 26.

Figure 2:
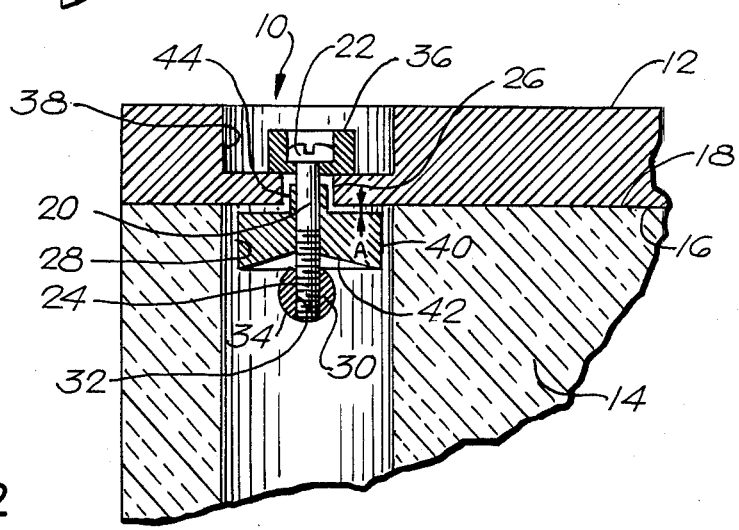
FIG. 2 is a fragmentary diagrammatic section taken generally along the line 2—2 in FIG. 1.

The threaded shank 24 of the bolt 20 is threadedly received by a nut 30 which spans the aperture 28 in the ceramic member 14. The nut 30 is preferably a rod nut in the form of a rod which is provided with a transverse threaded aperture 32 for threadedly receiving the threaded shank 24 of the bolt 20. The rod nut 30 is preferably circular in cross section, as shown in FIG. 2.

The ceramic member 14 has a formation which receives and holds the nut 30. Preferably, such formation is in the form of a transversely extending aperture or hole 34, through which the rod nut 30 may be inserted laterally. The laterally extending aperture 34 is sufficiently deep to have portions on diametrically opposite sides of the opening 28 in the ceramic member 14, so that the rod nut 30 spans the opening 28 when the rod nut is fully inserted. Preferably, the aperture 34 is slightly larger in diameter than the rod nut 30 to provide clearance for thermal expansion of the rod nut 30. Thus, for example, the diameter of the aperture 34 may be on the order of 0.003 of an inch larger than the diameter of the rod nut 30.

A cup-shaped guide washer 36 is optionally provided between the head 22 of the bolt 20 and the metal member 12. Optionally, the head 22 and the guide washer 36 are recessed into a countersunk recess 38 formed in the metal member 12.

When the bolt 20 is tightened, the bolt 20 and the nut 30 pull the metal and ceramic members 12 and 14 together so that the confronting surfaces 16 and 18 are clamped or pressed together. However, the clamping pressure exerted by the bolt 20 and the nut 30 is limited by a pressure limiting member 40 located in the opening 28 along the bolt 20 and between the nut 30 and the confronting surface 16 of the metal member 12. The pressure limiting member 40 is preferably in the form of an apertured washer which is received around the shank 24 of the bolt 20.

The pressure limiting washer or member 40 has a limiting thickness or dimension which is only slightly less than the predetermined distance between the nut 30 and the confronting surface 16 of the metal member 12. In the drawings, the difference between such thickness and such predetermined distance is labelled A. This initial clearance or differential distance A is the range of permitted movement between the nut 30 and the confronting surface 16 of the metal member 12. It has been found that such differential distance A should be made quite small, such as on the order of 0.001 of an inch, for example, to avoid damage to the ceramic member 14 when the bolt 20 is tightened. This value for the differential distance A has been found to be highly suitable when the metal member 12 is made of stainless steel and the ceramic member 14 is made of Mykroy or boron nitride.

The pressure limiting member 40 limits the movement which can be brought about between the metal member 12 and the nut 30 by tightening the bolt 20. Such movement is limited to the differential distance A. By limiting such movement, the pressure limiting member 40 limits the pressure which is applied to the ceramic material 14 by the nut 30.

The differential distance A may be varied by changing the thickness or limiting dimension of the pressure limiting washer 40. The differential distance A may be changed to suit the strength of various ceramic materials. Thus, for a stronger ceramic material, the differential distance A may be made greater. For a weaker ceramic material, the differential distance A should be made less, so as to limit the tightening effect of the bolt 20, and thereby prevent damage to the ceramic material.

The pressure limiting washer or member 40 is preferably formed with a generally cup-shaped relief or depression 42, facing toward the nut 30. The depth of such depression 42 should be quite small, such as on the order of 0.003 of an inch, for example. Such depression or relief 42 allows for slight resilient flexing of the rod nut 30 to reduce thermal stresses due to temperature changes. Such thermal stresses are produced by differential expansion and contraction of the metal and ceramic components due to temperature changes. The illustrated depression 42 is in the form of a shallow internal cone.

The illustrated pressure limiting member 40 has an upwardly projecting collar portion 44 which extends upwardly into the bolt hole 26 in the metal member 12 and assists in centering the shank 24 of the bolt 20 in the bolt hole 26 while aligning the bolt in a perpendicular position relative to the confronting surfaces 16 and 18 and the pressure limiting member 40. The collar portion 44 also assists in the initial assembly of the bolt 20 and the pressure limiting member 40.

In the process of screwing down the bolt 20, there is initially a gap corresponding to the differential distance A between the pressure limiting member 40 and the confronting surface 16 of the metal member 12. However, this gap is quite small, as previously indicated. As the bolt 20 is tightened down, the gap A is taken up by the pressure exerted by the bolt, so that the surface 16 comes into engagement with the upper end of the pressure limiting member 40. The lower end of the pressure limiting member 40 engages the nut 30. Thus, the pressure limiting member 40 limits the extent to which the bolt 20 can be tightened down. In this way, the pressure limiting member 40 limits the pressure exerted by the nut 30 on the ceramic member 14, so as to prevent damage to the ceramic member. In the design and construction of the fastening device 20, the differential distance or gap A can be varied to accommodate the strength of the ceramic material employed in the ceramic member 14. If the ceramic material is relatively strong, the differential distance A can be made greater than if the ceramic material is relatively weak mechanically.

By limiting and controlling the stress imposed upon the ceramic member 14, the pressure limiting member also protects the ceramic member against breakage due to thermal stresses arising from differential expansion and contraction of the metal and ceramic components. Thus, it is possible to maintain a sealing pressure between the metal and ceramic surfaces 16 and 18 throughout heating and cooling cycles ranging up to 400° C., while protecting the ceramic member against damage due to thermal stresses. The ability of the fastening device 10 to accommodate thermal stresses is enhanced by the shallow dish-shaped depression 42 in the end of the pressure limiting member 40 which engages the rod nut 30. Such depression accommodates a slight resilient flexing of the rod nut 30 due to differential expansion and contraction. Moreover, the depression ensures that the pressure limiting member 40 squarely engages the rod nut 30.

In actual tests, a metal-to-ceramic fastening device according to the present invention has been employed successfully to secure a stainless steel field plate and a stainless steel base plate to a Mykroy or boron nitride ceramic insulator in a field ionization source for a mass spectrometer. In this application, the fastening device has been tested and found to be totally operative and completely successful in securing the metal components to the ceramic component while eliminating any damage to the ceramic component, despite heating and cooling cycles ranging up to 400° C.

Various other modifications, alternative constructions and equivalents may be employed, within the true spirit and scope of the appended claims.

What is claimed is:

1. A fastening device for securing metal and ceramic elements together, comprising:
   a metal member and a ceramic member having respective confronting surfaces adapted to be clamped together,
   said metal member having a bolt hole therein,
   said ceramic member having an opening therein aligned with said bolt hole,
   a threaded bolt extending through said bolt hole and into said opening,
   a nut spanning said opening,
   said ceramic member having a formation receiving said nut and holding said nut at a predetermined distance from said confronting surfaces,
   said bolt being threadedly received in said nut,
   and a pressure limiting member received in said opening along said bolt and between said nut and said confronting surface on said metal member,
   said pressure limiting member having a limiting dimension limiting the movement of said metal member toward said nut and thereby limiting the pressure applied by said nut to said ceramic member to avoid damage to said ceramic member.

2. A device according to claim 1, in which said pressure limiting member takes the form of a washer received around said bolt between said nut and said confronting surface on said metal member, said washer having a thickness corresponding to said limiting dimension.

3. A device according to claim 2, in which said limiting dimension is only slightly less than said predetermined distance.

4. A device according to claim 2, in which said limiting dimension is on the order of 0.001 of an inch less than said predetermined distance.

5. A device according to claim 2, in which said limiting dimension is only slightly less than said predetermined distance.

6. A device according to claim 1, in which said limiting dimension is slightly less than that predetermined dimension by an amount on the order of 0.001 of an inch.

7. A device according to claim 1, in which said nut is a rod nut in the form of a rod having a threaded aperture therein for threadedly receiving said bolt.

8. A device according to claim 7, in which said formation is in the form of a laterally extending aperture in said ceramic member for lateral insertion of said rod nut into said ceramic member.

9. A device according to claim 7, in which said pressure limiting member is in the form of a washer received around said bolt between said rod nut and said confronting surface of said metal member.

10. A device according to claim 9, in which said washer is formed with a shallow dish-shaped depression facing said rod nut and allowing for slight resilient flexing of said rod nut to relieve stresses due to temperature changes.

11. A device according to claim 10, in which said depression has a depth on the order of 0.003 of an inch.

12. A device according to claim 8, in which said laterally extending aperture is made slightly larger than said rod nut to allow clearance for thermal expansion of said rod nut.

13. A device according to claim 8, in which said laterally extending aperture has a diameter larger than that of said rod nut by an amount on the order of 0.003 of an inch to allow clearance for thermal expansion of said rod nut.

14. A device according to claim 1, in which said pressure limiting member is in the form of a washer received around said bolt between said nut and said confronting surface of said metal member, said washer having a shallow dish-shaped depression facing toward said nut to reduce stresses due to temperature changes.

15. A device according to claim 14, in which said depression has a depth on the order of 0.003 of an inch.

16. A fastening device for securing a metal member and a ceramic member together with respective confronting surfaces thereon clamped together, said fastening device comprising:
   a threaded bolt adapted to extend through a bolt hole in the metal member and into an aligned opening in the ceramic member,
   a rod nut adapted to span the opening in the ceramic member,
   said rod nut being in the form of a rod having a threaded aperture for threadedly receiving said bolt,
   and a pressure limiting washer received around said bolt and engaging said nut for limiting the movement of said rod nut toward the metal member and thereby limiting the pressure applied by said rod nut to the ceramic member to avoid damage to the ceramic member.

17. A fastening device according to claim 16, in which said pressure limiting washer is formed with a generally cup-shaped depression facing toward said rod nut and providing for slight resilient flexing of said rod nut to reduce stresses due to temperature changes.

18. A fastening device according to claim 16, in which said pressure limiting washer is formed with a shallow generally cup-shaped depression facing toward said rod nut and having a depth on the order of 0.003 of an inch to provide for slight resilient flexing of said rod nut to reduce stresses due to temperature changes.

19. A fastening device for securing a metal member and a ceramic member together with respective confronting surfaces thereon clamped together, said fastening device comprising:
   a bolt having a head and a threaded shank adapted to extend through a bolt hole in the metal member and into an aligned opening in the ceramic member, a rod nut in the form of a rod having a transverse threaded aperture for threadedly receiving the the threaded shank of said bolt, said rod nut being adapted to span the opening in the ceramic member, and a pressure limiting washer received around said shank of said bolt and engaging said rod nut for limiting the movement of said rod nut toward the metal member and thereby limiting the pressure applied to the ceramic member by said nut to avoid damage to the ceramic member.

20. A fastening device according to claim 19, in which said pressure limiting washer is formed with a shallow generally dish-shaped depression facing toward said rod nut and providing for slight resilient flexing of said rod nut to reduce stresses due to temperature changes.

* * * * *